United States Patent [19]

Francois et al.

[11] Patent Number: 4,820,894
[45] Date of Patent: Apr. 11, 1989

[54] ELECTRO-EROSION MACHINE FOR AUTOMATIC MACHINING ACCORDING TO A CLOSED TRAJECTORY

[75] Inventors: Corcelle Francois, Thoiry, France; Lakatos Laszlo, Les Avanchets, Switzerland

[73] Assignee: Charmilles Technologies S.A., Geneve, Switzerland

[21] Appl. No.: 116,043

[22] Filed: Nov. 2, 1987

[30] Foreign Application Priority Data

Oct. 30, 1986 [CH] Switzerland ............... 4291/86

[51] Int. Cl.$^4$ .................................... B23H 7/02
[52] U.S. Cl. .......................... 219/69.12; 204/206
[58] Field of Search ............... 219/69 W, 69 M, 69 R; 83/586, 587; 173/89, 119; 204/206, 224 M; 225/96.5, 103; 92/5 R, 130 R

[56] References Cited

U.S. PATENT DOCUMENTS

| | | | |
|---|---|---|---|
| 2,602,507 | 7/1952 | Adams | 83/587 |
| 3,990,351 | 11/1976 | Sundin | 225/103 |
| 4,106,682 | 8/1978 | Ramun | 225/103 |
| 4,207,565 | 6/1980 | Isakson | 92/5 R |
| 4,274,438 | 6/1981 | La Coste | 92/5 R |
| 4,350,864 | 9/1982 | Janicke et al. | 219/69 W |
| 4,484,052 | 11/1984 | Inoue | 219/69 W |
| 4,544,819 | 10/1985 | Nomura et al. | 219/69 M |
| 4,571,477 | 2/1986 | Weber | 219/69 W |
| 4,601,349 | 7/1986 | Arentsen | 173/119 |

FOREIGN PATENT DOCUMENTS

| | | |
|---|---|---|
| 194353 | 9/1986 | European Pat. Off. ......... 219/69 W |
| 3209136 | 10/1982 | Fed. Rep. of Germany . |
| 126932 | 8/1982 | Japan . |
| 132926 | 8/1982 | Japan . |
| 58-28429 | 2/1983 | Japan . |
| 171218 | 10/1983 | Japan . |
| 259323 | 12/1985 | Japan . |
| 559599 | 3/1975 | Switzerland . |
| 646892 | 12/1984 | Switzerland . |
| 656082 | 6/1986 | Switzerland . |

*Primary Examiner*—A. D. Pellinen
*Assistant Examiner*—Geoffrey S. Evans
*Attorney, Agent, or Firm*—Gifford, Groh, Sheridan, Sprinkle and Dolgorukov

[57] ABSTRACT

An electro-erosion machine for automatic completion of a cutout according to a closed trajectory or whose ends reach the edges of a part to be machined, or for completing a hollowing by means of piercing the part to be machined all the way through, as well as separating, at a certain predetermined machining moment, a clipping still retained by a narrow bridge of material, said machine being fitted with a numerical control device and at least one machining head, as well as with an auxiliary device, designed to break the bridge which retains the clipping, said clipping being of any shape, and to drop or eject said clipping, the separating being accomplished either by percussion or by exerting a pressure on it, or by shearing the bridge or exerting a torsion-tearing couple on it, or by submitting it to a thermal effect or by localized radiation of the bridge. It can also include an attachment for receiving and automatically evacuating the clipping expelled in this manner. The ejection device, which can be attached to the machining head, is preferably equipped with a percussion piece or a pushing element, movable vertically and able to be maintained in the resting position in the ejector by an appropriate element of a known type.

20 Claims, 5 Drawing Sheets

ELECTRO-EROSION MACHINE FOR AUTOMATIC MACHINING ACCORDING TO A CLOSED TRAJECTORY

BACKGROUND OF THE INVENTION

I. Field of the invention:

The present invention relates to electro-erosion machines and more particularly to a device for separating from the machined workpiece the cutpart or "cutout" (hereinafter called clipping), produced by cutting a closed trajectory (or a trajectory whose ends reach the edge of the workpiece).

II. Description of the prior art:

Many solutions have been proposed to eliminate the machining defect which is caused by the clipping or cut part formed in a closed trajectory electro-erosion machining operation as it breaks away from the workpiece. The clipping will drop and then break off at some point just before the end of machining operations. Solutions to this problem have taken the form of a removable bracket located under the part to be machined JP-OS 57-126.932, 57-126.933 and 57-126.934; JP-OS 57-132.926, a center supporting part located under the latter (CH 656 082), or further, the provision of a supporting arm pivoting under the workpiece (JP-PS 58 1711218), or furthermore, of holding up of the dropping part by one of the supporting arms of the workpiece (CH 646892) by electromagnets (DE-OS 3.209136), and by using low fusion alloys or anaerobic glues (CH 559.599). However, where a connection is made between the workpiece and the clipping, these methods present a problem by interfering with accomplishing the finishing operation and by requiring that upon completion of the finishing operation it is still necessary to eliminate the binding material. In case of an additional supporting part being used to retain the clipping, there is generally a need to provide for a complicated controlling device to prevent an engagement between the wire electrode and the supporting arms and the additional supporting part. This is why it is recommended in the present state of the art, in particular in the Japanese patent application published under No. 58-28429, to stop the machining while the clipping is still being retained by a narrow bridge of material called the "isthmus".

For the sake of simplification, the word clipping will be used for the purpose of identifying the cut out part located inside the trajectory, whether it is a reject falling off the part to be obtained or the part itself desired to be obtained, the rejected portion being part of the rough-machined part. The mechanical resistance of the isthmus must be sufficient to counterbalance the mass of the clipping and to prevent it from collapsing and falling which can cause damage to the wire electrode or cause it to deviate the wire electrode to produce uneraseable marks on the machined surface. This isthmus can exist only on a part of the height of the clipping. Next, the clipping is broken off by hitting it with a hammer or cutting out the isthmus with a contour saw, as described in the Japanese application published under No. 58-28429. It is thus possible to make one or several rough-turnings on the same part, but it requires the intervention of an operator to hollow the cut out contours and, eventually, to reposition the part in the machining area before starting the finishing operation. A finishing operation could be, in fact, required to eliminate the "scar" actually formed because of the break of the isthmus and done through electro-erosion process or by any other known method.

According to the Japanese patent application published under No. 60-259323, the clipping can be also beaten down with an upper machining liquid supply nozzle for the purpose of breaking the isthmus (located on the whole height of the part to be hollowed) and then held up by a bottom machining liquid supply nozzle; the latter is then operated vertically upwards in order to remove the clipping for the hollowed orifice above the upper surface of the machined part. At this instant, an auxiliary supply emits a jet of machining liquid in order to blow out the clipping from the machining zone.

However, this arrangement can only be used for the purpose of separating clippings of a certain shape and it requires special devices on the two machining heads, as well as several precise adjustments of the latter. In fact, the machine must be provided with a bottom head capable of being moved vertically. Furthermore, since the upper nozzle is activated hydraulically downwards until reaching a fixed stop, its vertical displacement is fixed. It is therefore necessary to precisely adjust the distance between the clipping to be ejected and the upper head. Another inconvenience is the free working of the clipping in the hollowed hole. If the pressure produced by the lower nozzle, for the purpose of raising it across the hole is not applied exactly on its center of gravity, the clipping will get stuck against the rim of the hole, especially against the protuberance formed by the isthmus of material which subsides on the total height of the hole. The geometry of the ejectable clippings, using this method, is therefore limited to clippings which are not too thick, especially having a flat and horizontal lower face and horizontal, as well as an upper face whose center has a flat surface parallel to the lower face and whose surface is at least equal to the impacting surface of the nozzle. It must be mentioned that in case of machining several holes simultaneously in the workpiece, the clearing of the clippings by means of a liquid jet risks having the clipping getting stuck in one of the holes which have been machined already and is located on its trajectory.

SUMMARY OF THE PRESENT INVENTION

The present invention provides a device which selectively and automatically ruptures the isthmus between a clipping and the workpiece and ejects or drops the clipping regardless of its shape of the clipping and without the disadvantages of the prior art; i.e., the risk that the clipping places itself "across" and gets stuck on the edges of the machined hole, the need for machining heads conforming specially, particularly recourse to a vertically mobile nozzle, requiring several precise adjustments (distance between the upper nozzle and the clipping to be scraped out, horizontal positioning of the lower surface of the part to be machined, point of application of the stress by the lower nozzle). Thus, contrary to the teachings of the state of the art, the clipping is no longer retained once the bridge has been ruptured. Avoidance is made that the parts thusly disconnected, are gathered in the machining zone, by evacuating them automatically or, if their dimensions allow it, by distributing them in a machining tray or in a container placed on the trajectory of the clipping.

It is an object of the present invention to provide an electro-erosion machine having an auxiliary device, fitted to drop or eject at a predetermined moment of the machining operation, a clipping of any shape, retained by a narrow bridge of material, hanging on eventually, only on a part of the height of the clipping, either by breaking this bridge and by dropping or ejecting this clipping, either by percussion or by exercising a pressure on it, or by shearing this bridge or exercising on it a torsion-tearing couple, either by submitting it to a thermal effect or a radiation localized on this bridge. By "auxiliary" device, it is understood an additional device, different from the usual members generally present on EDM machining heads (wire guides, electrical contacts, machining liquid nozzles, etc.).

Such a device permits a workpiece to be cut out in an entirely automatic manner and without a machining defect, one or several closed contours, and this whether the piece has or has not upper and lower faces which are flat or parallel, and whatever its thickness. This is accomplished without a requirement of having a precise adjustment of the positions of the heads, especially that of their vertical positions. All it needs is to bring said device to face the clipping to be ejected, for example, by positioning the auxiliary device to the mark already used for the purpose of threading the wire hole, and located in any place of the future clipping, other than its center of gravity.

An auxiliary device, according to this invention, is preferably used for the purpose of disconnecting a clipping retained by a bridge of material subsisting on part of the height of the machined part. Thus, for example in case of an auxiliary device provided with a hammer or a percussion piece, it suffices to exercise a push or a relatively low impact on any point of the upper face of the clipping in order to disconnect it from the workpiece. It is, therefore, possible to use a hammer operated by its own mass. Thus, the confidence is increased by diminishing the probability of the clipping not being ejected.

For evident reasons, it is preferable to separate the cut out part of the initial part before going to the finishing step. But, in most known procedures, this requires stopping the automatic machining cycle and a human intervention. Owing to the present device, it is now possible to program the automatic pass of the rough-turning operation to that of the finishing operation, without being affected by the clipping, in order to accomplish the latter operation, i.e., without the well-known inconvenience of an in-the-slot finishing operation. It suffices to put this device in operation between the rough-turning operation and the finishing operation. Furthermore, this is also advantageous for the purpose of eliminating the "scar" produced by the rupture of the isthmus by doing the finishing itself, i.e., requiring only one single finishing operation, whereas before, when it was chosen to achieve the finishing while the clipping was still retained by the isthmus and and to eject this clipping at the end of the finishing operation, it was needed to proceed with a second finishing phase for the purpose of eliminating this "scar".

DESCRIPTION OF THE DRAWING

The device characterizing the electro-erosion cutting machine of the present invention can be made in an infinite number of forms of execution. Only some of them will be illustrated schematically and as an example by the attached drawing.

DESCRIPTION OF A PREFERRED EMBODIMENT

Figure 1:
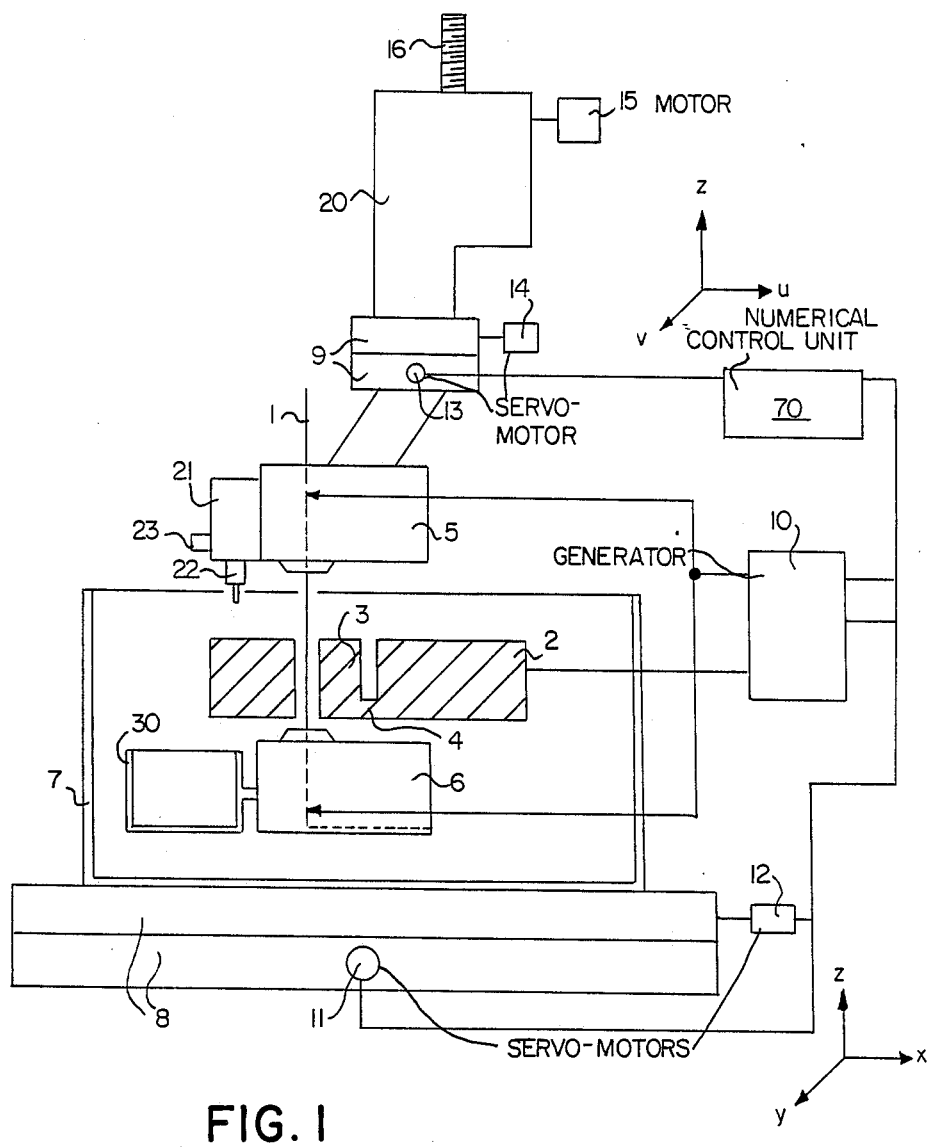
FIG. 1 is a schematic section of a cutting machine by electro-erosion containing the characteristic device of the present invention.

FIG. 1 shows schematically a machine of a known type for the purpose of cutting out a workpiece by electro-erosion with a wire electrode 1. The active part of the latter is strung between two guides of a known type (not shown) located inside two machining heads 5 and 6. Said heads are generally formed of a hard stone and/or sapphire or diamonds, pierced with an orifice. A table with cross movements 9 permits the wire electrode 1 to be inclined with respect to the vertical by displacing the upper machining head 5 with respect to the machining head 6, located in the tray 7. The displacement is made in the vertical plane of FIG. 1, defined by the axes of cartisian coordinates U and V. The upper head 5 is movable vertically, while the lower head 6 cannot be displaced with respect to workpiece 2, other than in the horizontal plane. Each machining head also contains a nozzle for the purpose of injecting the dielectric machining fluid and a contact (not shown) is mounted on an upper arm 20, movable vertically and carrying the machining head 5, while an advancing system of a known type (and therefore not shown) produces the continuous movement of the electrode wire 1. The upper arm 20 can also include a wire heating system as well as a cutting and an automatic wire rethreading device of the types described, for example, in the patents CH641709 and 646356 or the Swiss patent application 27621/85-1. Such a device permits several series of contours to be automatically cut out on the same part. A second table 3 with crossed movements of the tray 7 completes the relative movements between the wire 1 and the workpiece 2. The movements are made in a perpendicular plane of FIG. 1 and are defined by the cartisian coordinates X and Y.

Part 2 is held up by two brackets (not shown) in the tray 7 and are attached to the latter. An electric generator 10, also connected to the part 2 to be machined, causes erosive discharges between the wire 1 and the part 2, which is being cut out through the progressive advance of the wire 1 following a pre-established trajectory, controlled by servo-motors 11 and 12 of the cross-movements table 8, self controlled by a numerical control unit 70. Attachments, connect said unit on one hand to two servo-motors 13 and 14, which activate the cross-movements of the table 9 and permit the described inclination of the electrode wire 1 to be produced, and on the other hand to a motor 15 which controls the vertical movement of the upper machining head 5, following axis Z along the gear 16.

A cylindrical clipping ejection member 21 is mounted to the upper machining head 5 by means of a screw 23 and carries a vertical and removable driving bolt 22, whose lower end projects itself under the lower plane of the head 5. The cross-section of the bolt can be, for example, round or triangular. It can be made of the same cross-section throughout its whole length or it can have a truncated cone, having a cross-section whose surface diminishes as it goes towards its lower end. In the shape shown in FIG. 1, it has the shape of staged nipples, i.e., it is composed of a series of cylinders having the same axis, touching in twos by their bases and whose diameters are reduced as they reach towards the end.

Element 22 constitutes the stem of a piston whose head 24 can move to compress a spring. This compression causes automatically the stop, eventually preceded by a slowdown of the vertical movement of the arm 20. A collecting tray 30 is attached to the lower machining head 6 for the purpose of trapping a clipping 3 after it has been broken off from the isthmus. FIGS. 2 and 3 show schematically different machining stages of a part 2 in which it is desired to hollow it all the way through. The voiding volume projects itself on the upper plane of the part 2 according to a closed trajectory 18, and on its lower plane, according to the closed trajectory 19.

Figure 2A:
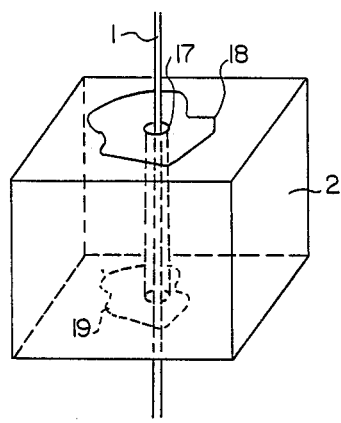
FIGS. 2 and 3 show schematically the different machining stages of a part by means of a device according to the present invention.

An orifice 17 has been previously pierced in part 2 at a predetermined location for the purpose of inserting the wire electrode 1 into it (FIG. 2a).

The numerical control programs the automatic threading of the wire 1, then actuates the cross-movements table 8 with the help of which part 2 can displace itself in relation to wire electrode 1 in a manner that the latter cuts out in workpiece 2, by means of electro-erosion, a starting channel joining the threading orifice 17 at two predetermined points A and B of trajectories 18 and 19.

Figure 2B:
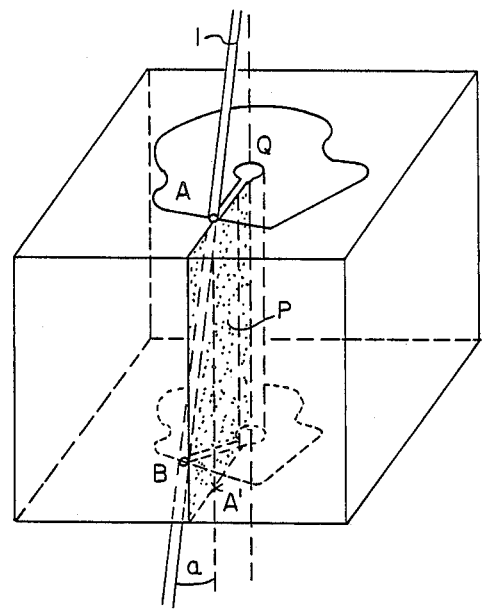
Figure 2C:
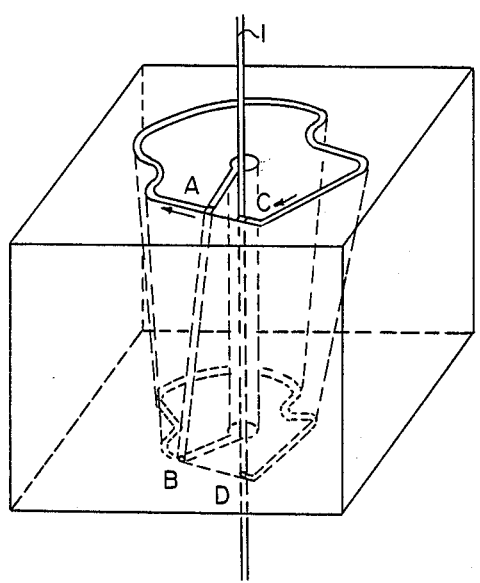
Figure 2D:
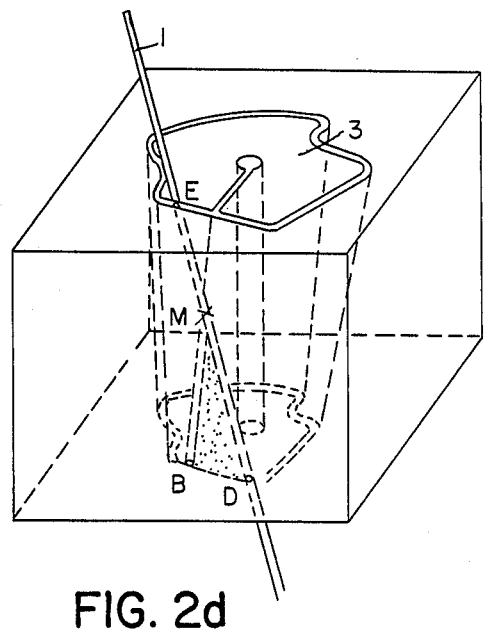

Because of the table with crossed movements, it is eventually possible to displace simultaneously the upper machining head 5 with respect to head 6, giving a certain slope to wire 1 with respect to the vertical. This is shown in FIG. 2b, where the straight line AB is inclined by an angle $\alpha$ with respect to the vertical plane P. (This plane contains the center Q of the orifice 17, the point A and its projection A' on the lower plane of part 2.) Then the cut out is made, in a known manner according to predetermined trajectories 18 and 19, going in the direction A' to B until the wire electrode gets to point C on the trajectory 18. It is then at the point D on the trajectory 19. A bridge AC on trajectory 18 and a bridge BD on trajectory 19 (FIG. 2c) remain.

Then the wire electrode 1 is sloped by displacing the head 5 so that it crosses the trajectory 18 at a predetermined point E. The central part to be emptied (clipping 3) is now retained to part 2 with the help of an uncut triangle of material MBD (M being the common point to straight lines AB and DE, FIG. 2d).

The numerical control 70 then stops the electro-erosion machining by switching off the generator 10 and by programming the cut and the withdrawal of the wire electrode 1. Next, it controls the positioning of the pushing bolt 22 to face the threading orifice 17 by translating the machined part 2. The trajectory of the clipping 3 is behind the lower machining head 6. The tray 30 is now positioned to capture the clipping 3. Finally, the numerical control acts on the motor 15 by lowering the arm along the gear 16.

FIG. 3 shows a first form of execution of a device with a pushing bolt, according to the present invention, whose pushing bolt is made of an electrically conductive material having a shape of staged nipples, as shown in FIG. 1.

The radii of two successive cylinders differ by a few millimeters, preferably by 2 mm. This permits the cylinders to be adapted to different threading holes 17, having different diameters. Head 24 of the piston is connected to the ground and is covered by an electro-conductive material 26. Spring 25 is calibrated to exercise a given pressure (force F).

Figure 3A:
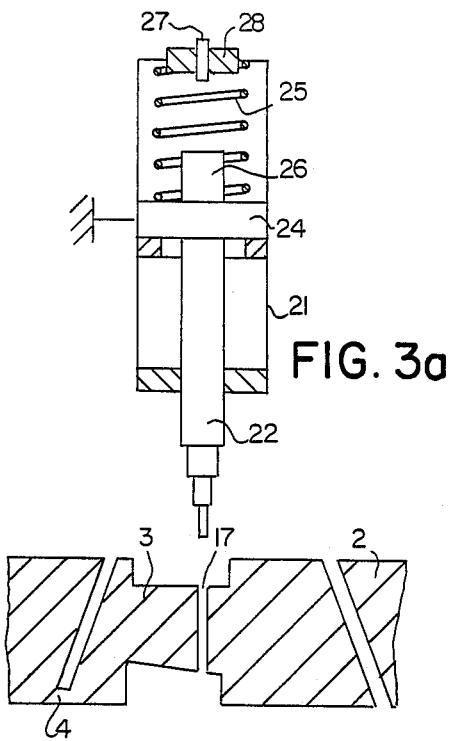
Figure 3B:
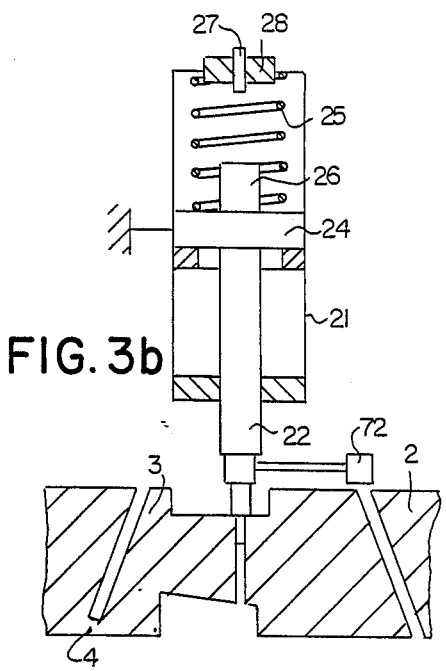

A first safety device 72 automatically FIG. 3b stops the lowering of the arm when a certain cross-section of the pushing bolt is at the height of the upper surface of part 2 to contact the safety device, and this is done for the purpose of counteracting a potential lack of expulsion of the clipping.

Figure 3C:
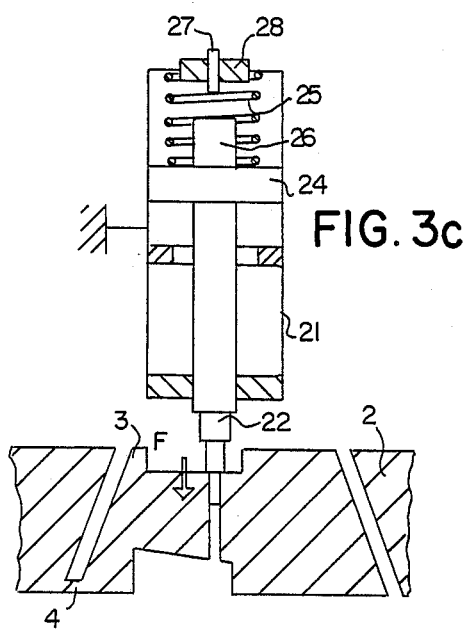
Figure 3D:
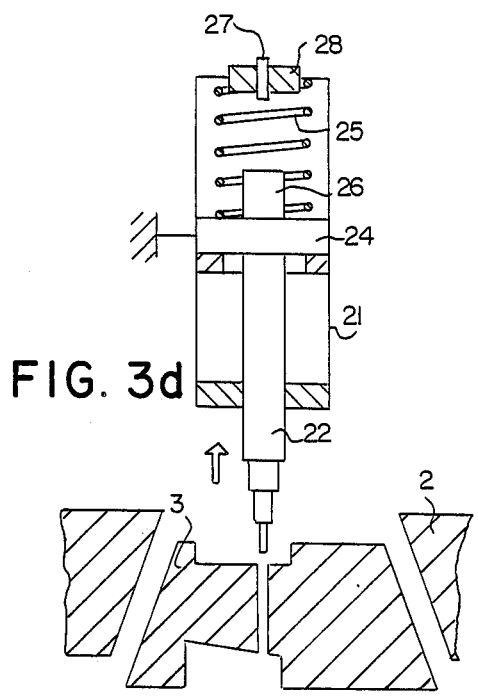

When the lowering of arm 20 starts (not shown) towards the clipping 3 to be expelled, spring 25 is not compressed (FIG. 3a). Next, pushing bolt 22 moves into contact with the edges of orifice 17. Spring 25 starts to compress (FIG. 3b). Spring 25 continues to compress until it develops a sufficient pushing force (force F) to eject clipping 3 (FIG. 3c). Isthmus 4 is broken, clipping 3 is ejected, moved by a vertical movement, the shape of pushing bolt 22 having the effect of a guide. Spring 25 expands and arm 20 starts an upward movement, programmed by the numerical control device (FIG. 3d).

In case there is no ejection, a second safety device is provided: the spring continues to compress until it gets to an electro-conductive stop 26, touching electrode 27, retained by an insulated ring 28, which stops the progress of arm 20. Force F, and therefore, the calibration of spring 25, have been determined experimentally, for example, or by measurements done by calibration, before starting the automatic machining cycle. The electrode contact 27 can be more or less moved into the cylindrical member 21.

The shape of the pushing bolt 22 is particularly advantageous because it permits the work to be done taking into account only the geometry and the coordinates of the threading hole, and to push out the clipping by engaging only a small surface of the latter. In fact, it is only necessary that the appropriate nipple of the pushing bolt 22 have a slightly larger diameter than the threading hole 17 and rests on a narrow band of material surrounding this orifice.

It is possible to eject clippings of an extreme variety of shapes, having, for example, any kind of lower surface, since it is not involved in the process of ejection. The upper surface is not necessarily horizontal. It can be slanted, have a relief, or even be asymetrical. The clipping can be flared towards the bottom because its elimination from the machining zone is made in that direction.

The numerical control can now program the threading of the wire electrode and either a second passing round of the latter along trajectories 18 and 19 for the purpose of completing the finishing operation of the voided surface made in that manner, or a new positioning of part 2 for the purpose of controlling the rough machining of a second hollowing, and so forth.

In case of a clipping of a relatively large mass, it may be advantageous to produce several isthmuses for the purpose of holding it up before its ejection, at an appropriate moment of the machining operation.

It is understood that the type of design described above does not have to be limited. It can be advantageously made in a variety of designs of the ejection device, described above. It should be particularly noted that the vertical movement of member 21 can be realized by other appropriate means of known type, such as hydraulic, pneumatic, mechanical, electrical, magnetic, etc., such as an auxiliary motor fitted out to control one or several light successive strokes of the assembly member 21/pushing bolt 22 on clipping 3.

This vertical movement of member 21 can, by the way, be independent of the movement of the machining head 5, carried by the arm 20, since the assembly member 21/bolt 22 is operated by one of the means mentioned above. Member 21, carrying member 22, can also be installed on the machining head 5, while only part 22 is operated vertically. The stroke can be applied at another spot which is not confused with the threading orifice 17, although in this manner, the programming of the numerical control is simplified since the latter already contains the coordinates of orifice 17.

Part 22 can be a percussion element stroking the clipping, either by means of its own weight or actuated by proper means such as pneumatically, hydraulically, electrically, magnetically, mechanically, by decompression of a spring or expulsion controlled by gas, provoked chemically or spark-actuated. Member 21 must therefore be a device which actuates one or several forces of the above-mentioned types, and able to operate percussion element 21. It also presents, in general, a device which permits the percussion element to resume its resting position in member 21. However, in certain types of designs, it is possible, when percussion part 22 is made in a proper shape, to recuperate it at the end of the automatic machining operation, with the clippings, for example. This raising device can, itself, be actuated by one or several forces of the above-mentioned types (pneumatic, electric, etc.). It can also use a permanent connection (spring, cable, etc.) between member 21 and the percussion element 22 which permits the latter to raise in its location and to maintain it in the resting position.

As in case of the pushing element, the impact of the percussion element 22 is not necessarily confused with the threading hole 17. It can be located at any point on the surface of clipping 3 or the isthmus 4. A slight force exercised by the pushing or percussion element 22 is enough, generally, to break the bridge of material 4. In the opposite case, it is possible to control successive pushings or percussions. A device can be provided to signal the numerical control that the clipping has been ejected.

Figure 4:
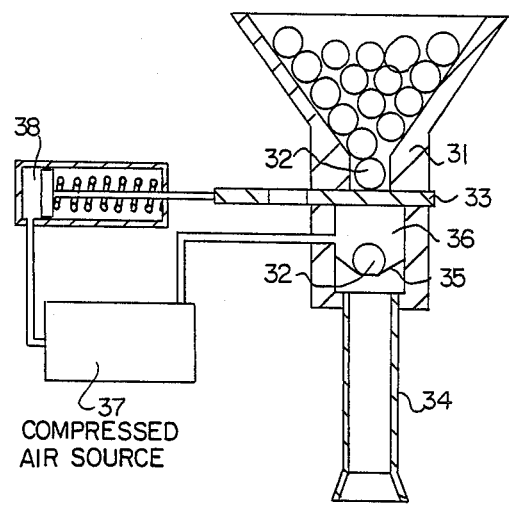
FIGS. 4, 5 and 6 show some of the numerous forms of possible designs of the percussion piece or hammer according to the present invention.
Figure 4:
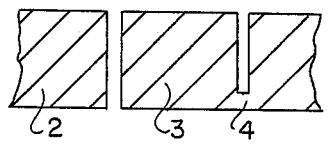

FIG. 4 shows, for sake of example, a modification of the element 21, according to the present invention, containing a feeder 31 containing balls 32, closed by a slider 33, moving back and forth under an opening provided at the base of feeder 31 which allows the balls 32 to fall across a vertical guide 34 in order to strike the clipping 3 or isthmus 4. A flexible membrane 35, located adjacent the lower aperture of the feeder 31, complete the drop of balls 32, centered along guiding axis 34.

The balls 32 have the proper size and mass for the purpose of achieving the desired intensity of percussion. It could involve, for example, lead balls covered with a layer of stainless steel, whose dimensions are proper for the purpose of achieving the desired percussion. The dimensions of the lower (aperture) opening of the feeder 31 and the cross-section of guide 34 are obviously proper to fit those of balls 32.

The drop of the balls 32 can be initiated by their proper weight. To control the percussion, it is only necessary to control the horizontal movement of slider 33, with the help of a motor or a compressed air jack 38, as shown in FIG. 4. There is an advantage in using a membrane 35, having sufficient resistance to retain the ball 32. To obtain the percussion, it suffices to control the drop of this ball 32 by injecting compressed air in the space 36, located between the slider 33 and the membrane 35, by means of a channel which connects the space 36 to a compressed air source 37, for example. The air supply to the jack 38 and the space 36 by the compressed air supply source 37 can be controlled automatically by the numerical control unit which operates the other machining devices of the electro-erosion machine. This compressed air supply source can be of known industrial type or, for example, similar to a BB gun.

By way of an example, a second possible design can be utilized which includes the element 21. It is shown in FIG. 5. Element 21 includes a percussion member 22 in the shape of a vertical bar provided with a counterweight 41 surrounding its upper end and, preferably, removably attached to a bar 22 for the purpose of adjusting, as desired, the mass of the assembly and therefore the intensity of the force applied to the bridge. It can also be provided, at its lower end, with a removable part 40 having a varying mass and shape. The stroke of the percussion member 22 can be adjusted by the stop 42 restraining a counterweight 41. The position of the stop 42 can, preferably, vary along the trajectory of the percussion member 22 as a function of the distance the machined part 2 is located, carrying the clipping 3 to be expelled.

Figure 5A:
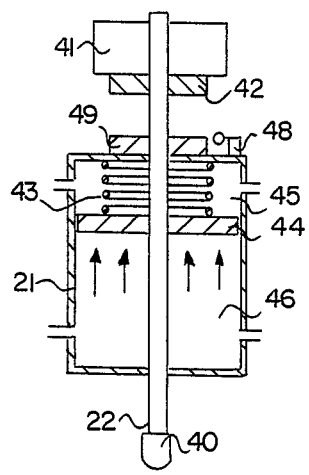
Figure 5A:
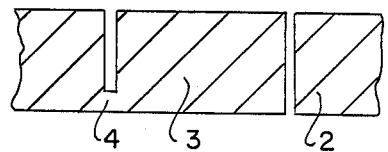
Figure 5B:
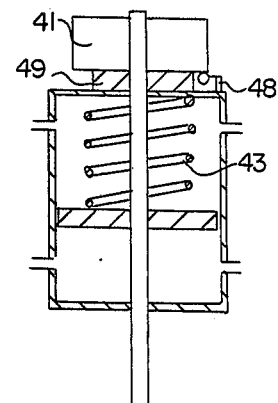
Figure 5B:
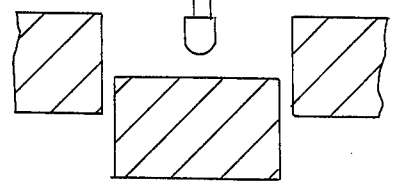

Furthermore, it is movable horizontally and can be separated from the percussion member by any known means for the purpose of allowing it to drop freely (FIG. 5b). Element 21 is a pneumatic jack provided with a spring 43 in its upper chamber 45. A source of compressed air, equipped with a pressure regulator (not shown) can supply compressed air to the lower chamber 46 or, alternately, to the upper chamber 45 and the lower chamber 46 of the jack 21, operating washer 44 with a back and forth movement. The washer 44 is designed to be part of the percussion member 22; the latter can also be moved vertically by the compressed air source.

The percussion force can, therefore, be the combination of three means acting upon the percussion member: the mass of the assembly percussion member - counterweight, the pressure of the compressed air in the upper chamber 45, and the spring 43 pressure acting upon the washer 44. It is possible to confine the action to the first and the last means of operation, and use the intervention of compressed air pressure for raising the percussion member by supplying the lower chamber 46 for the purpose of repelling washer 44 and therefore percussion member 22 upwards. The speed of the vertical movement of the percussion member can be varied by the varying release of the compressed air from the cylinder or the stiffness of the spring. It suffices to actuate the means of repositioning of the stop 42 in order to get back to the starting position (FIG. 5a).

Figure 6A:
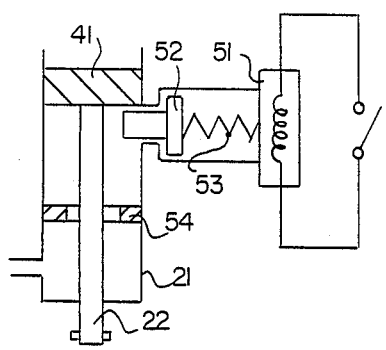
Figure 6B:
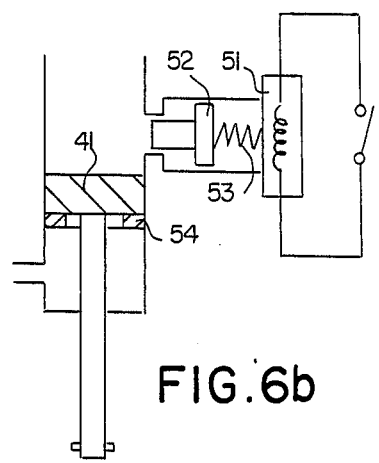

The element 21 can be provided with a sensing switch 48 for detecting the drop of the clipping, activated by counterweight 41, when it comes to stop on joint 49, located above the jack 21, which will indicate whether the clipping dropped or did not. It can also be advantageous to use a device as that shown in FIG. 6. The jack 21, which can be activated hydraulically or pneumatically, is provided with a stop 54 which prevents the shock of the counterweight 41 on the bottom of the jack 21. The assembly percussion member 22 - counterweight 41 is held in the upper position by the slider 52. The latter is made of a ferromagnetic material and can be operated horizontally with the help of an electromagnet 51. The counterweight 41, whose stroke functions entirely inside the jack 21, acts like a piston. All it needs is to connect the electromagnet 51 to attract the slider 52 outside the internal chamber of jack 21 and thus to drop the assembly percussion member 22 - counterweight 41, by the action of their own mass (FIG. 6e). Spring 53 is then compressed between the slider 52 and the electromagnet 51. In order to raise the percussion device to its resting position, jack 21 is operated by feeding its lower chamber with gas or compressed fluid, for the purpose of pushing back the counterweight upwards to disconnect the electromagnet 51 by the decompressed action of the spring 53. The slider 52 penetrates again in the internal chamber of the jack 21 and holds up the counterweight 41 in its upper position. The supply to the jack 21 can now be stopped eliminating the over-pressure inside the jack.

Instead of providing an element operated in a fashion to push or beat down clipping 3, it is also possible to put into action a means for acting directly on the bridge of material 4, by chiseling or submitting it to a thermal effect or a localized radiation, for example. The clipping ejected and collected in that manner in a receptacle can be evacuated automatically by a device mounted on the upper head, for example, or by an independent mobile element provided with a magnet, for example.

Figure 7A:
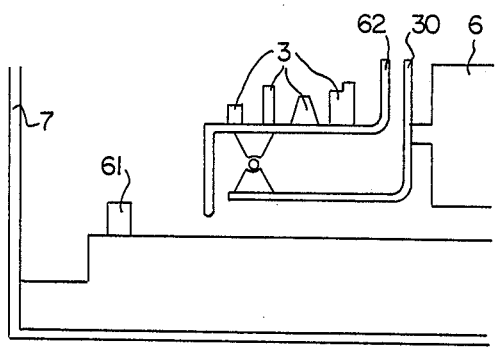
FIG. 7 shows schematically a form of execution of a tray for the ejected clippings according to the present invention.
Figure 7B:
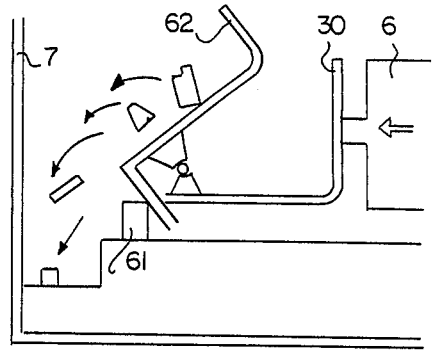

It may be advantageous to provide a kind of stop 61 (FIG. 7a), coming to rest on part of the receptacle 30, for instance the bottom, this receptacle being attached to the lower machining head 6 when the table with cross-movements 8 (FIG. 1) is animated with a horizontal translation, parallel to axis X, for example. This will tip the double bottom of the receptacle 30 and thus drop automatically the clipping 3 into a receptacle set outside tray 7' or in a zone of the tray 7 not used for the machining operation.

The control of this device is very simple. All is needed is to control the translation of the table 8. A system for returning the table 8 to the horizontal position is provided to bring back the double bottom 62 of the receptacle 30 when it is separated from stop 61. It can be of a known type, such as a counterweight, for example.

It is also possible to provide a receptacle 30 designed for the protection of the elements present in tray 7, such as a recipient of any shape and of dimensions to fit the number and dimension of the clippings, arranged in a manner to collect the clipping as soon as the isthmus is broken, or even a net, for example, made of stainless steel lattice, attached to the rim of the tray. This receptacle could be made to automatically expel the clippings contained in the tray after a certain predetermined number of ejections. It can also be made of a sufficient size to contain all the expected clippings during a machining cycle and corresponding to a number of orifices in the machined part; the evacuation of the clippings is then made before the start of the next machining cycle.

Figure 8A:
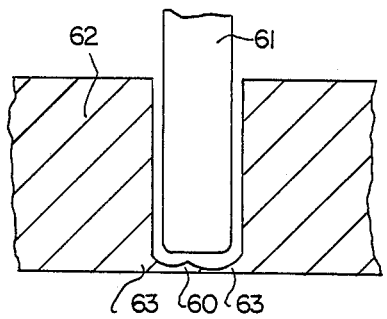
FIG. 8 illustrates an application of the device according to the present invention during penetrating operation by electro-erosion.
Figure 8B:
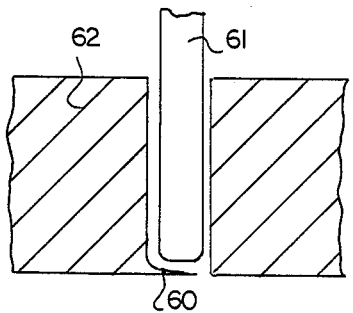

The receptacle can then be advantageously provided with means of equalizing the distribution of the clippings. It should be mentioned that the clipping expulsion device, according to the present invention, described above, as related to an electro-erosion machine, for wire electrode cutting machine can also be used with an electro-erosion cutting machine having an other electrode than a wire, or in case of a sinking EDM machine, provided that it is desired to hollow the part on all its thickness. In fact, it is known that a thin film of material 60 subsides at the bottom of the orifice at the end of the machining operation, as shown in FIG. 8, when the sinking electrode 64 is used to pierce the part to be machined, the latter, which will assume approximately the shape shown in FIGS. 8 and 8b, will be eroded in an irregular fashion, which causes machining defects.

An ejecting device, similar to the one described above, can be advantageously used for the purpose of breaking the weak bridges of material 63 and to eject the clipping 60. The sinking tool 64 can thereafter be used for the finishing operation.

The device of the present invention does not present any limitations or constraints on electro-erosion devices constructed in accordance with the state of the art, especially when considered with respect to the geometry of the workpiece (and of the clipping) to the complexity of the adjustments to be made and to the relative reliability, especially as far as the clipping evacuation is concerned.

It is, in fact, possible to evacuate automatically in a reliable manner (i.e., eliminating the risk of getting them stuck in the hollowed hole) clippings of any configuration.

The only limitation is the profile of the lateral faces of the clipping which must be configured to allow them to fall towards the bottom or to be ejected. Particularly, there is no requirement that the sides be perfectly vertical, as described in the Japanese patent application published under No. 60-259323.

Furthermore, it is only necessary to position the ejector above the clipping. The location of the point of impact or the application of the pressure with respect to the center of gravity of this clipping is of no importance. The numerical control device has only a horizontal movement to program. It is not even required to register the new coordinates because by placing the ejector in a position facing the threading hole, the coordinates of the latter will automatically be in the numerical control device.

Contrary to the device described in the Japanese patent application published under No. 60-259323, it is not necessary to adjust, with precision, the distance between the upper head and the part, as well as the position of the two machining heads with respect to the part, especially for the purpose of having the coordinates of the pressure point of the lower nozzle on the lower face of the clipping, to coincide with the center of gravity of the latter (this for having the pressure applied well vertically for avoiding sticking).

The evacuation of the clipping from the machining zone is also simpler and more reliable than the devices described in the state of the art. As the clipping simply falls into either an appropriate working tray or a receptacle, it is not necessary, for example, to raise it through the hollowed hole, as described in the Japanese application published under No. 60-259323, and eliminate it by an additional device, such as a liquid jet, tweezers or suction cups for grasping the clipping and its translation outside the machining zone, etc. The reliability can also be enhanced because the fall of the clipping is very easy to detect and it is, therefore, possible to design a very simple detector to re-activate the ejector if the clipping does not fall out. Finally, it should be understood that certain designs of the device, according to the present invention, offer a great degree of flexibility of application. It can, therefore, be provided that the stress intensity or impact can be adjusted as a function of material bridge resistance holding the clipping, or that the stress application can cease as soon as the clipping is ejected, or, further, the intensity and duration of the stress are adjustable.

While a preferred embodiment of the present invention has been described including several preferred modifications thereof, it should be apparent to one of even ordinary skill in the art that many other modifications can be made and that the invention can take other forms without departing from the scope and the spirit of the present invention as expressed in the following claims.

We claim:

1. An electro-erosion machine for machining a workpiece and separating, at a certain predetermined time during a machining operation, a clipping formed in a workpiece and retained by a narrow bridge of material, said machine comprising:
    an upper arm movably positioned over said workpiece;
    means for selectively positioning said upper arm over said workpiece;
    a machining head mounted to said upper arm;
    an auxiliary ejection device mounted to said upper arm and operable in a vertical direction to rupture said bridge and separate said clipping from said workpiece so that said clipping falls downwardly from said workpiece; and
    a numerical control device for controlling the operation of said machine.

2. The electro-erosion machine according to claim 1, and wherein said auxiliary device ruptures said bridge either by percussion, or by exerting a thrust on it, or by shearing the bridge, or by exerting a torsion-tearing couple on it, or by submitting it to a thermal effect or to radiation localized on said bridge.

3. The electro-erosion machine according to claim 1, and wherein said auxiliary device includes an expelling element having a percussion piece.

4. The electro-erosion machine according to claim 3 characterized by the fact that said expelling element is movable vertically and that said auxiliary device comprises means for freeing said expelling element so that said expelling element moves to expel said clipping and means for urging said expelling element to a rest position.

5. The electro-erosion machine according to claim 3 characterized by said auxiliary device having means for mechanically actuating said expelling element.

6. The electro-erosion machine according to claim 3, characterized by the fact that said auxiliary device is provided with means for vertically actuating said expelling element.

7. The electro-erosion machine according to claim 6, characterized by said expelling element being actuated by its own gravity.

8. The electro-erosion machine according to claim 6, characterized by said expelling element being actuated by at least one spring.

9. The electro-erosion machine according to claim 6, characterized by the fact that said auxiliary device is provided with a safety device adjustable with respect to the distance separating said clipping and said expelling element, said safety system stopping the progression of said expelling element as soon as its lower end reaches a predetermined vertical height.

10. The electro-erosion machine according to claim 6, characterized by the fact that said auxiliary device is provided with a first system having means for signaling said numerical control device when said clipping has been expelled and a second system having means for stopping the progression of said expelling element in response to a signal from said first system.

11. The electro-erosion machine according to claim 3, comprising means for adjusting the vertical movement of said auxiliary device.

12. The electro-erosion machine according to claim 3, comprising means for adjusting the speed of the vertical movement of said auxiliary device.

13. The electro-erosion machine according to claim 3, comprising means for adjusting the intensity of the force delivered by said auxiliary device.

14. The electro-erosion machine according to claim 1, comprising means for automatic evacuation of said clippings.

15. The electro-erosion machine according to claim 1, comprising a receptacle for automatically collecting and evacuating said clipping.

16. The electro-erosion machine according to claim 1 comprises a wire electrode and a lower machine head whose vertical position is fixed.

17. The electro-erosion machine according to claim 1, wherein said machine comprises a wire electrode and an automatic wire cutting and threading device, said threading device forming a threading hole in the part to be cut by said machine.

18. The electro-erosion machine according to claim 17, wherein said numerical control device comprises means for positioning said ejection device at a point defined in the horizontal plane by the same coordinates as those of said threading hole formed in said part.

19. An electro-erosion machine for cutting a clipping from a workpiece by means of a wire electrode, said machine being provided with an ejection device arranged for separating at a certain moment of the machining operation said clipping from said workpiece that is still retained by a narrow bridge of material, a numerical control device, an upper machining head and a lower machining head, said machine further comprising:
    means for stopping the machining and cutting of said workpiece by said wire electrode,
    means for horizontally displacing said lower head to the outside of the machining zone,
    means for positioning said auxiliary device at a determined point, opposite to said clipping to be expelled, and
    means for actuating said auxiliary device for separating said clipping to eject said clipping downwardly to a working tray.

20. The electro-erosion machine according to claim 19, characterized by the fact that only one adjustment is made, namely the positioning of the auxiliary device at a point defined by the coordinates in the hoirzontal plane.

* * * * *